(12) United States Patent
Green

(10) Patent No.: US 7,065,422 B1
(45) Date of Patent: Jun. 20, 2006

(54) METHOD AND APPARATUS FOR SYSTEM STATE CLASSIFICATION

(75) Inventor: Eric O. Green, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 658 days.

(21) Appl. No.: 10/185,471

(22) Filed: Jun. 28, 2002

(51) Int. Cl.
*G06F 19/00* (2006.01)

(52) U.S. Cl. .................. 700/108; 700/32; 700/111; 700/121; 702/181

(58) Field of Classification Search .............. 700/12, 700/32–34, 49, 52, 73, 95, 96, 108, 111, 121; 702/181; 706/45
See application file for complete search history.

(56) References Cited

U.S. PATENT DOCUMENTS

| | | | |
|---|---|---|---|
| 5,864,773 A * | 1/1999 | Barna et al. ............... | 702/85 |
| 6,535,783 B1 * | 3/2003 | Miller et al. ............... | 700/121 |
| 6,671,570 B1 * | 12/2003 | Schulze ...................... | 700/121 |
| 6,751,575 B1 * | 6/2004 | Lenz et al. .................. | 702/182 |
| 6,853,920 B1 * | 2/2005 | Hsiung et al. ............... | 702/1 |
| 6,895,293 B1 * | 5/2005 | Reiss et al. ................. | 700/110 |
| 2003/0033032 A1 * | 2/2003 | Lind et al. ................... | 700/52 |

* cited by examiner

*Primary Examiner*—Jayprakash N. Gandhi
(74) *Attorney, Agent, or Firm*—Williams, Morgan & Amerson

(57) ABSTRACT

A method for identifying a state of a manufacturing system includes defining at least one virtual sensor having a value. At least one state descriptor including a plurality of condition terms and a trigger probability is defined. Each condition term includes a function of the value of the virtual sensor. The condition terms are evaluated based on the value to determine a classification probability. The state is identified responsive to the classification probability being greater to or equal to the trigger probability. A manufacturing system including a plurality of tools, at least one virtual sensor, and a state classification unit is also provided.

36 Claims, 4 Drawing Sheets

300

| 310 | 310 | 310 | 310 |
|-----|-----|-----|-----|
| 320 | 320 | 320 | 320 |
|     |     |     |     |
|     |     |     |     |

Figure 3

METHOD AND APPARATUS FOR SYSTEM STATE CLASSIFICATION

BACKGROUND OF THE INVENTION

1. Field of the Invention

This invention relates generally to the field of semiconductor device manufacturing and, more particularly, to a method and apparatus for system state classification.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

Data gathered during the course of wafer processing is used to identify and attempt to mitigate the effects of process and equipment variations by implementing automatic control techniques and/or automatic fault detection and classification (FDC) techniques based on the collected metrology or tool data. Current commercially available FDC fail to provide comprehensive and integrated architectures. The commercial multivariate software solves only a piece of the puzzle. In many situations, the conditions observed in the FDC data have been encountered before. However, currently available systems do not readily classify the state of the systems based on this historical knowledge. Accordingly, engineering resources must be expended to analyze the FDC data and troubleshoot the problems.

The present invention is directed to overcoming, or at least reducing the effects of, one or more of the problems set forth above.

SUMMARY OF THE INVENTION

One aspect of the present invention is seen in a method for identifying a state of a manufacturing system. The method includes defining at least one virtual sensor having a value. At least one state descriptor including a plurality of condition terms and a trigger probability is defined. Each condition term includes a function of the value of the virtual sensor. The condition terms are evaluated based on the value to determine a classification probability. The state is identified responsive to the classification probability being greater to or equal to the trigger probability.

Another aspect of the present invention is seen in a manufacturing system including a plurality of tools, at least one virtual sensor, and a state classification unit. The virtual sensor has a value associated with at least one of the tools. The state classification unit is configured to define at least one state descriptor including a plurality of condition terms and a trigger probability, each condition term including a function of the value of the virtual sensor, evaluate the condition terms based on the value to determine a classification probability, and identify a state responsive to the classification probability being greater to or equal to the trigger probability.

BRIEF DESCRIPTION OF THE DRAWINGS

The invention may be understood by reference to the following description taken in conjunction with the accompanying drawings, in which like reference numerals identify like elements, and in which:

FIG. 3 is a diagram of a state matrix employed by a state classification unit in the manufacturing system of FIG. 1.

Figure 1:
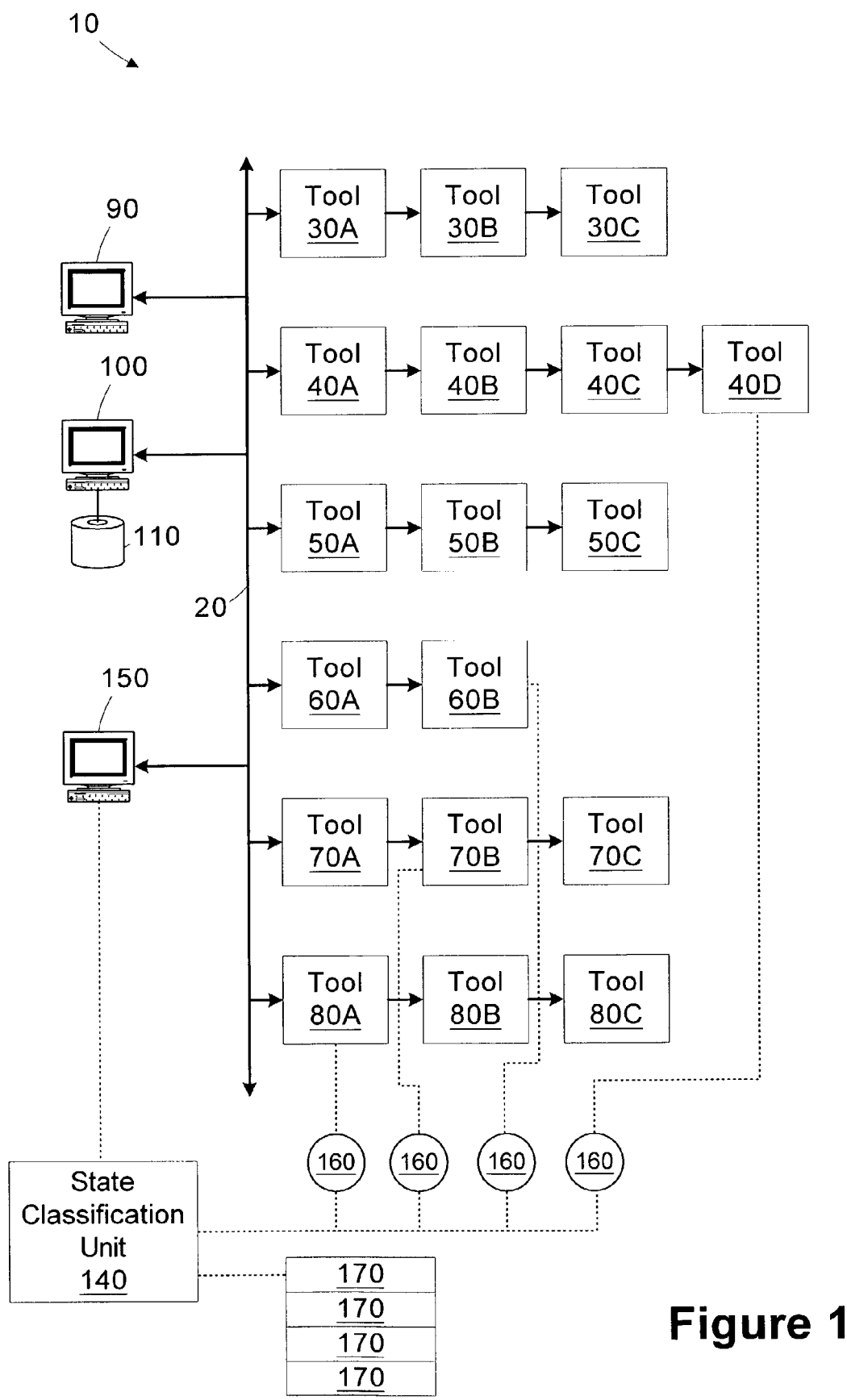
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items including, but not limited to microprocessors, memory devices, digital signal processors, application specific integrated circuits (ASICs), or other similar devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment, include metrology tools, photolithography steppers, etch tools, deposition tools, polishing tools, rapid thermal processing tools, implantation tools, etc. The tools 30–80 are illustrated in a rank and file grouping for illustrative purposes only. In an actual implementation, the tools may be arranged in any order or grouping. Additionally, the connections between the tools in a particular grouping are meant to represent only connections to the network 20, rather than interconnections between the tools.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The distribution of the processing and data storage functions amongst the different computers or workstations in FIG. 1 is generally conducted to provide independence and central information storage. Of course, different numbers of computers and different arrangements may be used.

The manufacturing system 10 also includes a state classification unit 140 executing on a workstation 150. As described in greater detail below, the state classification unit 140 monitors the entities in the manufacturing system 10 and automatically identifies and classifies states associated with tools 30–80 or processes under observation. Although the MES server 90 and state classification unit 140 are shown as separate entities, they may be integrated into a single unit.

The MES server 90 stores metrology data related to the particular tools 30–80 used to process each lot of wafers in the data store 110. The metrology data may include feature measurements, process layer thicknesses, electrical performance characteristics, defect measurements, surface profiles, etc. Maintenance history for the tools 30–80 (e.g., cleaning, consumable item replacement, repair) may also be stored in the data store 110 by the MES server 90 or by a tool operator. This information may be used by the state classification unit 140 to perform its state observation functions.

To facilitate state observation, the state classification unit 140 employs a plurality of virtual sensors 160. A virtual sensor 160 may represent a measured quantity or a computed quantity. For measured quantities, the virtual sensor 160 may represent an actual sensor or metrology tool. For example, the chamber pressure of an etch tool may be designated as a virtual sensor 160. In determining the virtual sensor 160 value, the state classification unit 140 accesses the data store 110 or the particular tool 30–80 equipped with a pressure sensor to determine the value of the most recent pressure measurement (i.e., or the pressure measurement for a designated processing run). The virtual sensor 160 may be associated with an operating variable of the tool 30–80 during a production run or an environmental condition experienced by the tool (e.g., temperature, humidity, etc.) The virtual sensor 160 may also correspond to a specific metrology measurement of an output characteristic of a workpiece (e.g., wafer) processed by the tool 30–80, such as a critical dimension of a feature measured by a scanning electron microscope. Where the virtual sensor 160 represents a calculated quantity, the state classification unit 140 may collect one or more data values and combine them to generate the virtual sensor value. For example, the virtual sensor 160 may represent a mass flow ratio between reactant and inert gases in a deposition chamber. Another exemplary calculated value is a health metric that may be determined using tool state trace data collected during a processing run of one of the tools 30–80. An exemplary tool health monitor software application is ModelWare™ offered by Triant, Inc. of Nanaimo, British Columbia, Canada Vancouver, Canada. An exemplary system for monitoring tool health is described in U.S. patent application Ser. No. 09/863,822, entitled "METHOD AND APPARATUS FOR MONITORING TOOL HEALTH," filed in the names of Elfido Coss Jr., Richard J. Markle, and Patrick M. Cowan, that is assigned to the assignee of the present application and incorporated herein by reference in its entirety. The state classification unit 140 employs the virtual sensor 160 information to classify the state of the entity in the manufacturing system 10 being observed.

Figure 2:
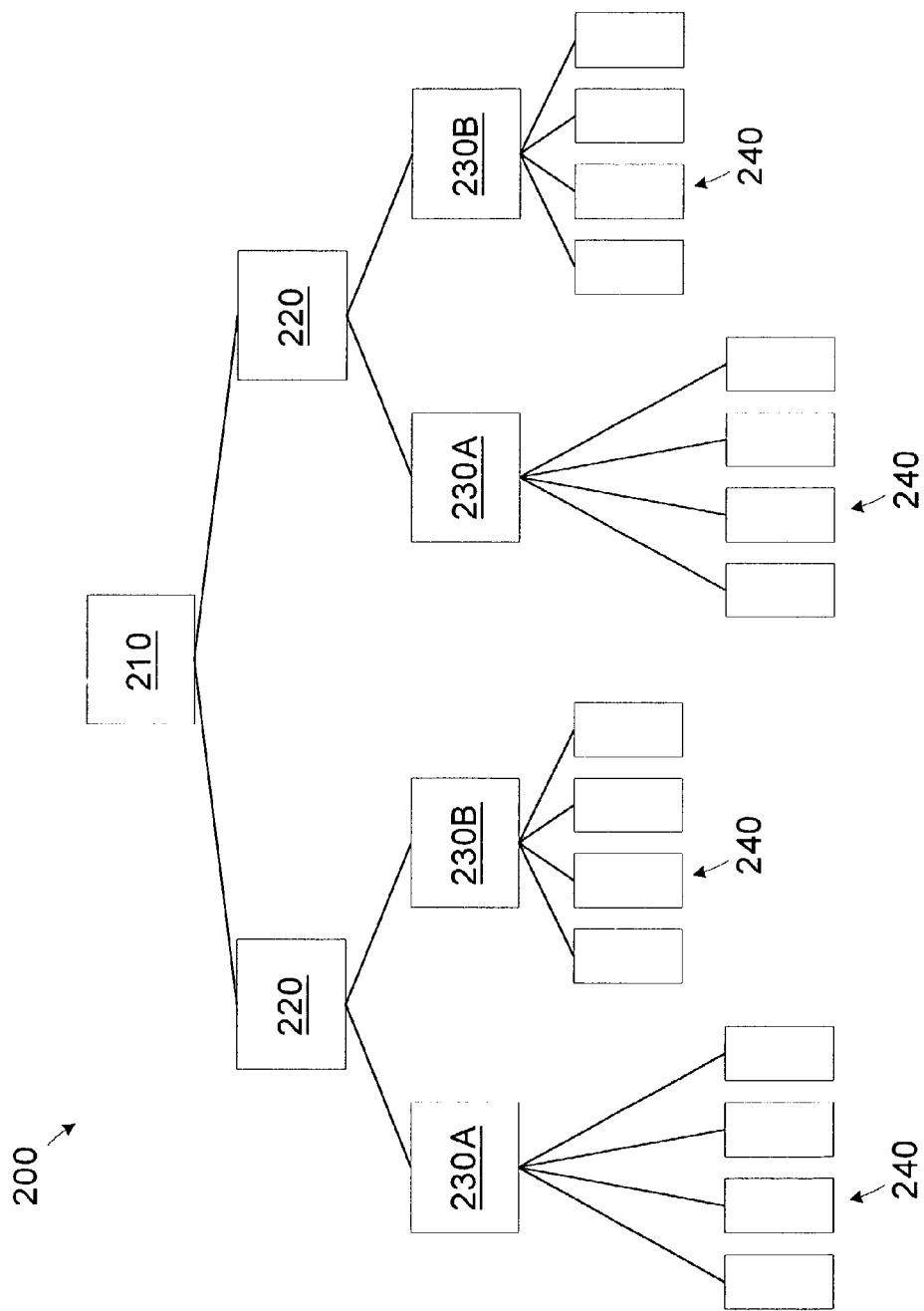
FIG. 2 is a diagram of a state classification tree used in the classification of the manufacturing system of FIG. 1.

In the illustrated embodiment, the state classification unit 140 employs an observation tree 200, shown in FIG. 2, to represent the system under observation. The observation tree 200 includes nodes 210, 220, 230, 240 arranged in a hierarchical orientation. The node 210 may represent a tool 30–80 under observation, such as a chemical vapor deposition (CVD) tool with multiple chambers. The nodes 220 represent each of the chambers. The nodes 230A may represent the gas subsystem, and the nodes 230B, may represent the temperature subsystem. The nodes 240 may represent virtual sensors 160 for the subsystems. For example, gas parameters, such as mass flow rates, pressure, etc., may be defined as virtual sensors 160 for the gas subsystem, and temperature parameters, such as chamber temperature, wafer temperature, etc., may be defined as virtual sensors 160 for the temperature subsystem. Virtual sensors 160 may be defined for any node 210, 220, 230, 240 at any hierarchical level. For example, the state of the chamber may be defined at the node 220 using information from the lower level nodes 230, 240, or using other information not included in the lower hierarchy levels. The observation tree 200 illustrates only one possible technique for representing the system under observation. Other organizations and hierarchies may be employed.

The state classification unit 140 employs state descriptors 170 (see FIG. 1) to encode human expert knowledge representing the possible states and conditions that may be automatically classified. In the illustrated embodiment, the state descriptors 170 have the following format:

State1: "State Description 1" TriggerProbability condition1 condition 2 . . . condition n State2: "State Description 2" TriggerProbability condition1 condition 2 . . . condition n State3: "State Description 3" TriggerProbability condition1 condition 2 . . . condition n Statek: "State Description k" TriggerProbability condition1 condition 2 . . . condition n The StateDescription field is a text filed encoded for a human reader that designates the engineering experience or first principles captured by the state descriptor 170. Each state descriptor 170 has a TriggerProbability that provides a threshold limit that must be reached or exceeded before the state classification unit 140 declares the existence of the state. Each condition in the state descriptor 170 defines the respective state.

Figure 3:
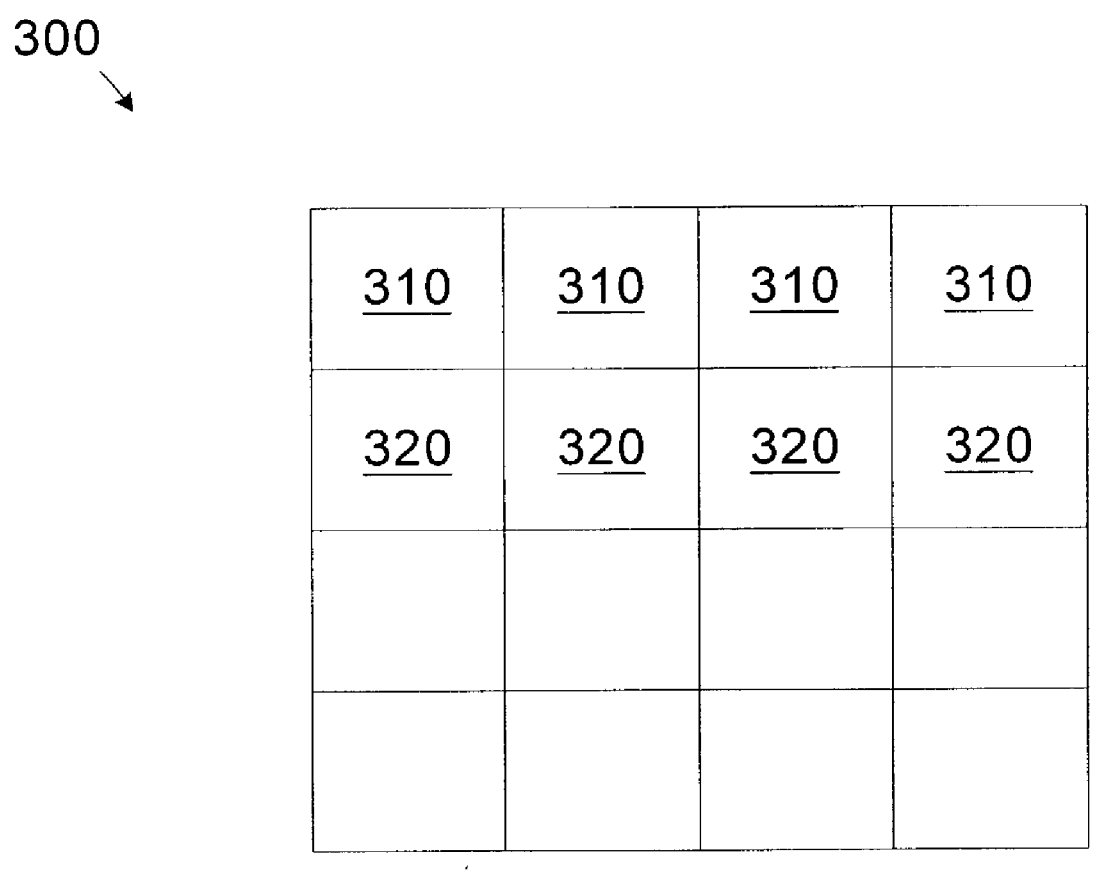

Turning now to FIG. 3, a diagram of a state matrix 300 used by the state classification unit 140 to evaluate the state. Each cell 310, 320 in the matrix 300 represents one of the conditions in the state descriptor 170. For example, the cells 310 may represent pressure conditions (e.g., min(P)<P1, max(P)>P2, median(P)>P4 or <P5, stdev(P)>P6). The cells 320 may represent temperature conditions (e.g., min(T)<T1, max(T)>T2, median(T)>T4 or <T5, stdev(T)>T6). In the illustrated embodiment, the format for a condition element in the state descriptor 170 is:

Condition=VirtualSensorName TimeSlice Filter StatisticToCalc TestOperator ThresholdOrWindow.

An exemplary condition element is:

Condition=[Silane Flow] [Step5] [100 Samples] [Standard Deviation] [>] [0.90]

When all the virtual sensors 160 in the observation tree 200 are updated, the state classification unit 140 sets a bit in the state matrix 300 for each condition. The state classification unit 140 then determines the classification probability by dividing the number of cells 310, 320 with positive results by the total number of defined conditions (i.e., cells):

ClassificationProbability=# Matched Conditions/Total # of Conditions.

Once the ClassificationProbabilities are calculated for each state descriptor 170, the results are tested against the respective TriggerProbability. If the ClassificationProbability is greater than or equal to the TriggerProbability, the state classification unit 140 indicates the existence of the state. The state classification unit 140 sends a state classification message to designated operations or engineering personnel responsive to identifying the state. The state classification message may include an email message, an visual indication provided on a graphical user interface, a report printout, etc.

The states defined by the state descriptors 170 may be determined by operations or engineering personnel based on expected performance or based on the results observed during production. In some cases, other multivariate statistical tools may be used to identify potential problem conditions in the manufacturing system 10. The results of these tools may be incorporated into additional state descriptors 170

Figure 4:
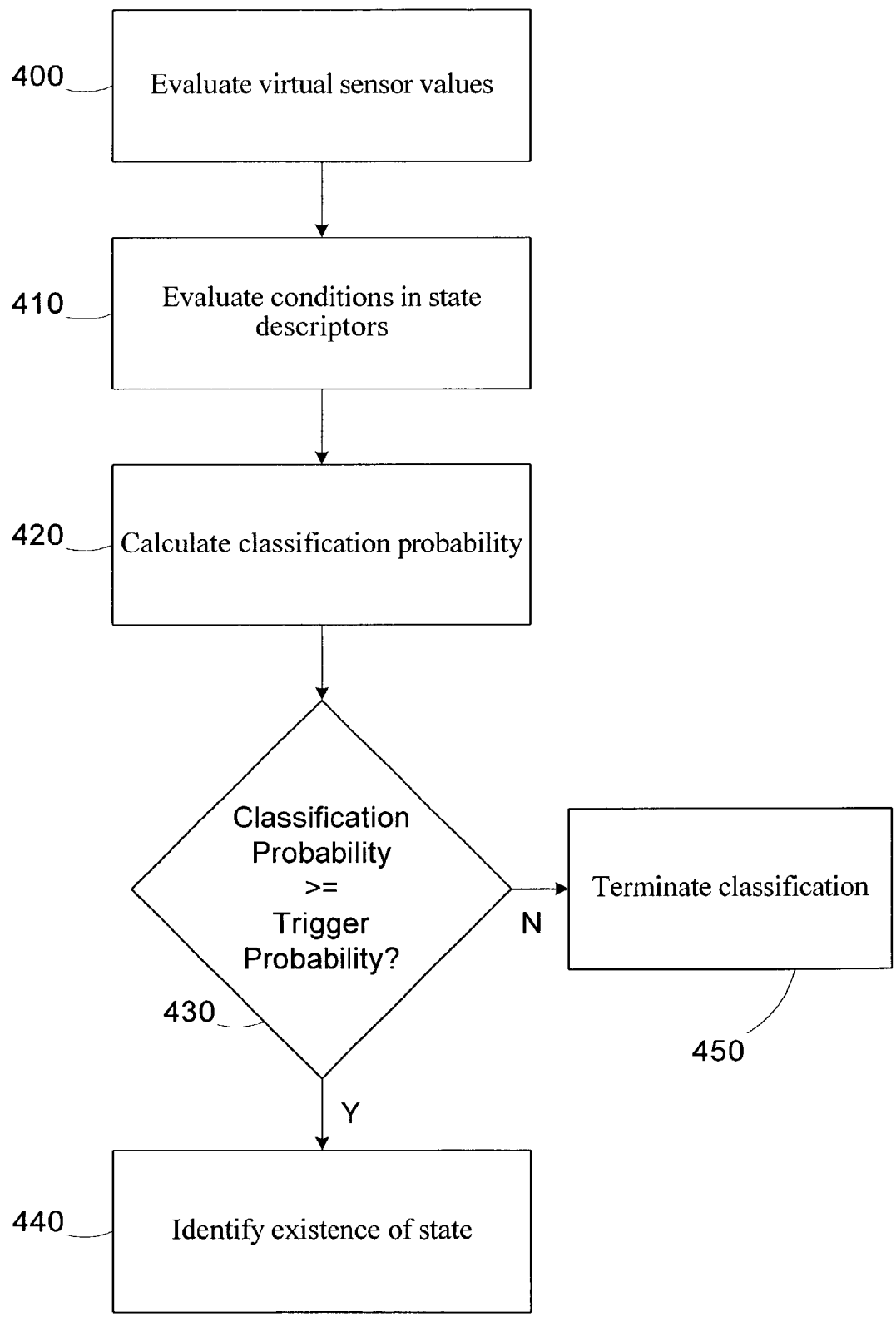
FIG. 4 is a simplified flow diagram of a method for classifying states in the manufacturing system of FIG. 1.

Referring to FIG. 4, a flow diagram of the process used by the state classification unit 140 to classify states in the manufacturing system 10 of FIG. 1 is provided. In block 400, the state classification unit 140 evaluates the virtual sensors 160. The state classification unit 140 may perform the state classification at predetermined intervals or after predefined events, such as the updating of a virtual sensor 160 data point. For example, after a processing run of a tool 30–80 or the collection of metrology data, the state classification unit 140 may be invoked. In block 410, the state classification unit 140 evaluates conditions in the state descriptors 170 to apply the expert knowledge base patterns. In block 420, the state classification unit 140 calculates the ClassificationProbability based on the satisfied conditions. In block 430, the state classification unit 140 determines if the ClassificationProbability meets or exceeds the TriggerThreshold. The state classification unit 140 identifies the existence of the state in block 440 or terminates without designating the presence of the state in block 450, depending on the results of the threshold test in block 430.

The number and form of different manufacturing systems that can be represented in a tree data structure, such as the observation tree 200, are virtually endless. As well, the number of possible state descriptors 170 and their defining conditions is also endless. The state classification unit 140 may identify not only for fault states, but also warning and "golden" or ideal states. The state classification unit 140 can identify remembered statistical patterns found in the trace data and communicate the identified states to engineering, operations, or management staff. The definition of states and expert knowledge encoding provides a great deal of flexibility and allows the rapid identification of changing conditions in the manufacturing system 10.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for using a computer processor to identify a state of a manufacturing system, comprising;
    defining at least one virtual sensor having a value;
    defining at least one state descriptor including a plurality of Boolean condition terms and a trigger probability, each condition term including a logical function of the value of the virtual sensor;
    evaluating the condition terms based on the value to determine a classification probability; and
    identifying the state responsive to the classification probability being greater to or equal to the trigger probability.

2. The method of claim 1, further comprising generating a state classification message responsive to identifying the state.

3. The method of claim 2, wherein generating the state classification message further comprises generating at least one of an email message, a visual display, and a report.

4. The method of claim 1, wherein evaluating the condition terms further comprises determining a ratio between condition terms that are satisfied to a total number of condition terms to generate the classification probability.

5. The method of claim 1, wherein the virtual sensor is associated with a tool in the manufacturing system and defining the virtual sensor further comprises determining the value based on a process variable measured during a processing run of the tool.

6. The method of claim 1, wherein the virtual sensor is associated with a tool in the manufacturing system and defining the virtual sensor further comprises determining the value based on an output characteristic measured on a workpiece processed in the tool.

7. The method of claim 1, herein the virtual sensor is associated with a tool in the manufacturing system and defining the virtual sensor further comprises determining the value based on an environmental condition experienced by the tool.

8. The method of claim 1, wherein defining the virtual sensor further comprises associating the virtual sensor with a physical sensor on a tool in the manufacturing system.

9. The method of claim 1, wherein defining the viral sensor further comprises receiving a plurality of sensor values associated with a tool in the manufacturing system and determining the value based on a combination of the plurality of sensor values.

10. The method of claim 1, further comprising evaluating the condition terms and identifying the state at predetermined time intervals.

11. The method of claim 1, further comprising evaluating the condition terms and identifying the state responsive to a change in the value of the virtual sensor.

12. A method for using a computer processor to classify states of a manufacturing system, comprising:
    providing a classification tree having a plurality of nodes for at least a portion of the manufacturing system;
    defining a plurality of virtual sensors for the manufacturing system, each virtual sensor having a value;
    defining a state descriptor including a plurality of Boolean condition terms and a trigger probability for each of a subset of the nodes, each condition term including a logical function of the value of at least one of the virtual sensors; and
    for each of the state descriptors:
    evaluating the condition terms based on the value to determine a classification probability; and
    identifying a state associated with the state descriptor responsive to the classification probability being greater to or equal to the trigger probability.

13. The method of claim 12, further comprising generating a state classification message responsive to identifying the state.

14. The method of claim 13, wherein generating the state classification message further comprises generating at least one of an email message, a visual display, and a report.

15. The method of claim 12, wherein evaluating, the condition terms further comprises determining a ratio between condition terms that are satisfied to a total number of condition terms to generate the classification probability.

16. The method of claim 12, wherein at least one of the virtual sensors is associated with a tool in the manufacturing system and defining the at least one virtual sensor further comprises determining the value based on a process variable measured during a processing run of the tool.

17. The method of claim 12, wherein at least one of the virtual sensors is associated with a tool in the manufacturing system and defining the at least one virtual sensor further comprises determining the value based on an output characteristic measured on a workpiece processed in the tool.

18. The method of claim 12, wherein at least one of the virtual sensors is associated with a tool in the manufacturing system and defining the at least one virtual sensor further comprises determining the value based on an environmental condition experienced by the tool.

19. The method of claim 12, further comprising associating at least one of the virtual sensors with a physical sensor on a tool in the manufacturing system.

20. The method of claim 12, wherein deter the value for at least one of the virtual sensors further comprises receiving a plurality of sensor values associated with a tool in the manufacturing system and determining the value based on a combination of the plurality of sensor values.

21. The method of claim 12, further comprising evaluating the condition terms and identifying the state for each of the state descriptors at predetermined time intervals.

22. The method of claim 12, further comprising evaluating the condition terms and identifying the state for at least one of the state descriptors responsive to a change in the value of the associated virtual sensor.

23. A manufacturing system, comprising:
a plurality of tools;
at least one virtual sensor having a value associated with at least one of the tools; and
a state classification unit configured to define at least one state descriptor including a plurality of Boolean condition terms and a trigger probability, each condition term including a logical function of the value of the virtual sensor, evaluate the condition terms based on the value to determine a classification probability, and identify a state responsive to the classification probability being greater to or equal to the trigger probability.

24. The system of claim 23, wherein the state classification unit is further configured to generate a state classification message responsive to identifying the state.

25. The system of claim 24, wherein the state classification message further comprises at least one of an email message, a visual display, and a report.

26. The system of claim 23, wherein the state classification unit is further configured to determine a ratio between condition terms that are satisfied to a total number of condition terms to generate the classification probability.

27. The system of claim 23, wherein the viral sensor is associated with a tool in the manufacturing system and the value comprises a process variable measured during a processing run of the tool.

28. The system of claim 23, wherein the virtual sensor is associated with a tool in the manufacturing system and the value comprises an output characteristic measured on a workpiece processed in the tool.

29. The system of claim 23, wherein the virtual sensor is associated with a tool in the manufacturing system and the value comprises an environmental condition experienced by the tool.

30. The system of claim 23, further comprising a physical sensor associated with one of the plurality of tools, wherein the virtual sensor is associated with the virtual sensor.

31. The system of claim 23, wherein the state classification unit is further configured to receive a plurality of sensor values associated with one of the tools and determine the value based on a combination of the plurality of sensor values.

32. The system of claim 23, wherein the state classification unit is further configured to evaluate the condition ems and identify the state at predetermined time intervals.

33. The system of claim 23, wherein the state classification unit is further configured to evaluate the condition terms and identify the state responsive to a change in the value of the virtual sensor.

34. A manufacturing system, comprising:
a plurality of tools;
a plurality of virtual sensors, each having a value associated with at least one of the tools; and
a state classification unit configured to manufacturing a classification tree having a plurality of nodes for at least a portion of the manufacturing system, define a state descriptor including a plurality of Boolean condition terms and a trigger probability for each of a subset of the nodes, each condition term including a logical function of the value of at least one of the virtual sensors, and for each of the state descriptors, evaluate the condition terms based on the value to determine a classification probability and identify a state associated with the state descriptor responsive to the classification probability being greater to or equal to the trigger probability.

35. A system for identifying a state of a manufacturing system comprising:
means for defining at least one virtual sensor having a value;
means for defining at least one state descriptor including a plurality of Boolean condition terms and a trigger probability, each condition term including a logical function of the value of the virtual sensor;
means for evaluating the condition terms based on the value to determine a classification probability; and
means for ide identifying the state responsive to the classification probability being greater to or equal to the trigger probability.

36. A system for classifying states of a manufacturing system, comprising:
means for providing a classification tree having a plurality of nodes for at least a portion of the manufacturing system;
means for defining a plurality of virtual sensors for the manufacturing system, each virtual sensor having a value;
means for defining a state descriptor including a plurality of Boolean condition terms and a trigger probability for each of a subset of the nodes, each condition term including a logical function of the value of at least one of the virtual sensors; and
for each of the state descriptors:
means for evaluating the condition terms based on the value to determine a classification probability; and
means for identifying a state associated with the state descriptor responsive to the classification probability being greater to or equal to the trigger probability.

* * * * *